United States Patent [19]

Clubb

[11] 4,078,701

[45] Mar. 14, 1978

[54] MULTIPLE VESSEL CONTAINER UNIT

[76] Inventor: Esther R. Clubb, 991 E. Washington, El Cajon, Calif. 92020

[21] Appl. No.: 666,025

[22] Filed: Mar. 11, 1976

[51] Int. Cl.$^2$ .................... B65D 21/00; A47G 23/04
[52] U.S. Cl. .................... 222/130; 222/143; 222/146 C; 220/4 D; 206/501; 206/509; 206/546; 206/549; 62/372; 62/529
[58] Field of Search .................... 222/143, 130, 146 C; 220/4 D; 206/501, 509, 549, 545, 546; 215/6; 62/371, 372, 529, 457

[56] References Cited

U.S. PATENT DOCUMENTS

| | | | |
|---|---|---|---|
| 2,339,580 | 1/1944 | Park | 206/545 X |
| 2,595,113 | 4/1952 | Taberer | 220/4 D |
| 2,652,698 | 9/1953 | Schlumbohm | 62/457 X |
| 3,384,259 | 5/1968 | Hoffstadt | 206/545 X |
| 3,998,351 | 12/1976 | Smith et al. | 206/501 X |

FOREIGN PATENT DOCUMENTS 1,068,661   2/1954   France .................... 206/501

Primary Examiner—Robert B. Reeves
Assistant Examiner—Frederick R. Handren
Attorney, Agent, or Firm—Thomas M. Scofield

[57] ABSTRACT

Improvements in multiple vessel container assemblies made up of one vessel removably mountable and secureable on top of another vessel, with the bottom end of the upper vessel and the top end of the lower vessel interconnectable with one another; multiple vessel container assemblies adapted to carry liquids, which vessels optionally may be insulated from one another or to heat exchange one another; multiple vessel container assemblies of versatile use and carrying capacity with respect to ice and liquids for drinking purposes, each vessel separately chargeable with and able to dispense either or both of ice and liquids.

3 Claims, 9 Drawing Figures

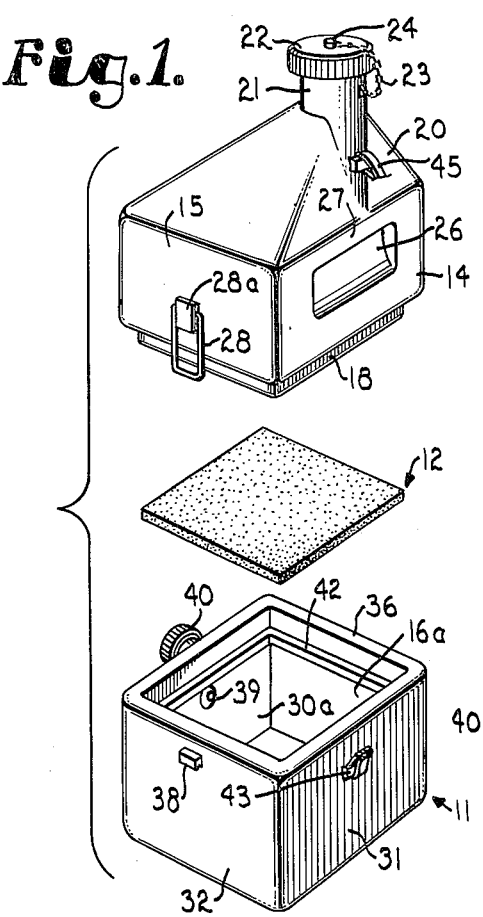
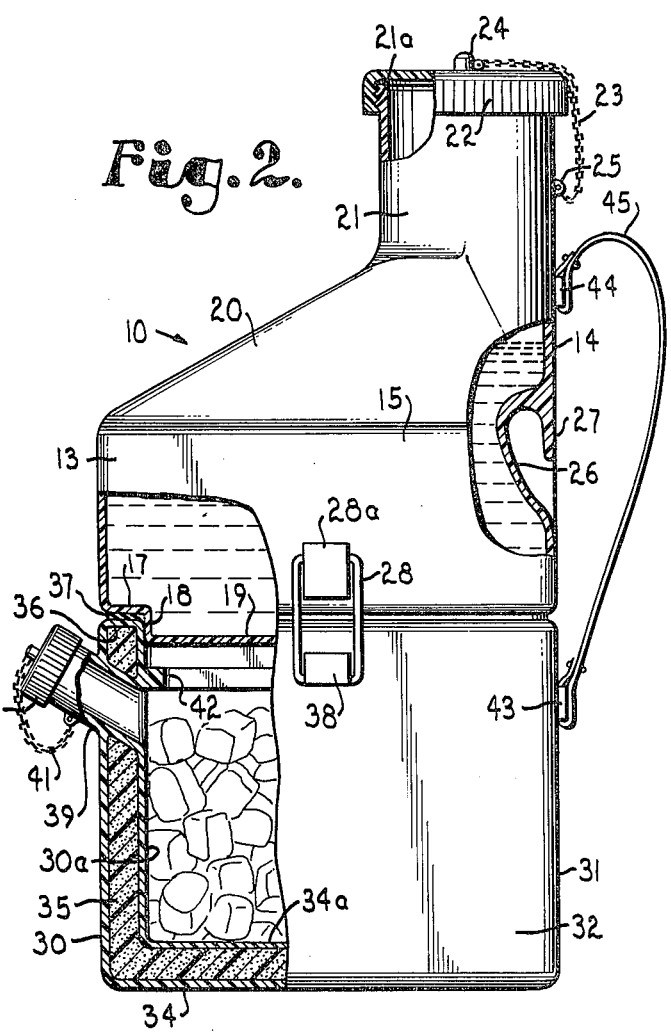
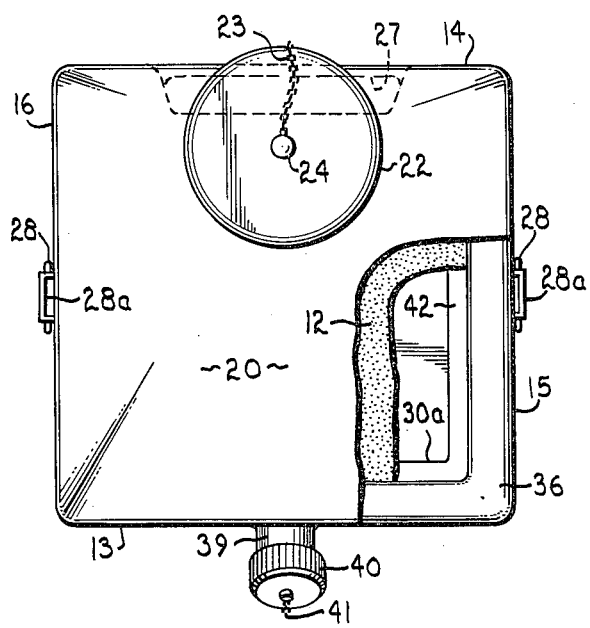
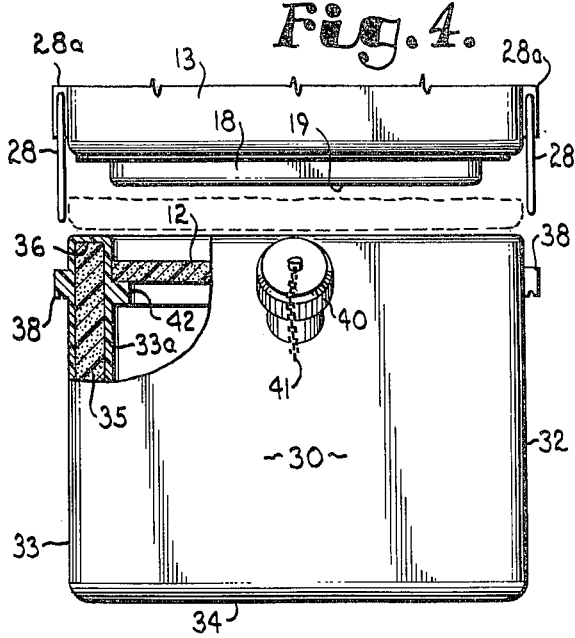

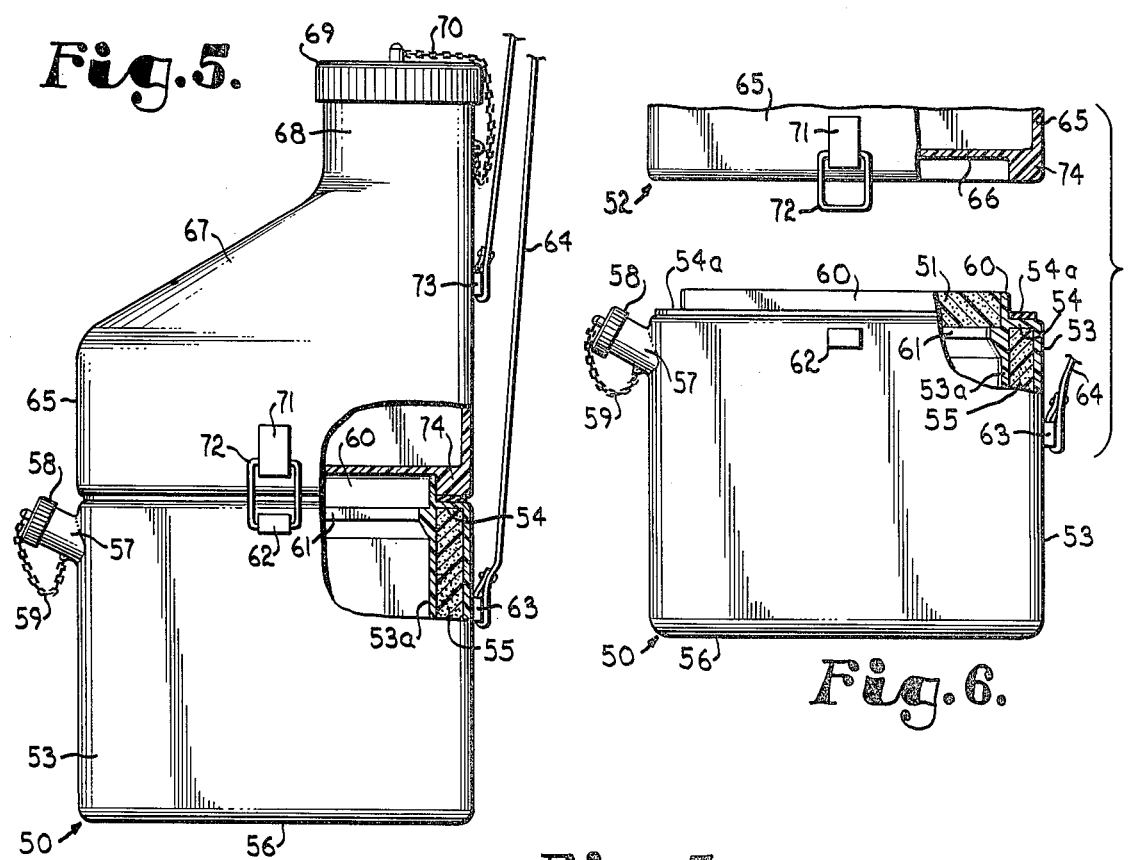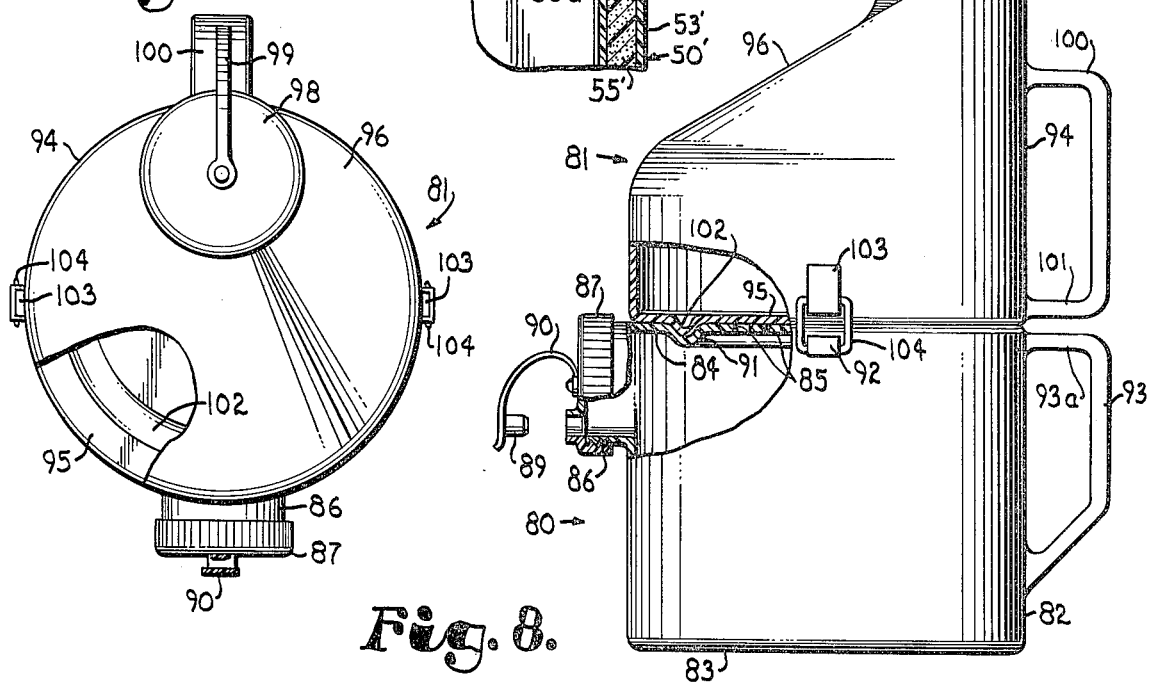

MULTIPLE VESSEL CONTAINER UNIT

THE PRIOR ART

I am aware of the following patents directed to stacked or multi-part containers:

Clapp U.S. Pat. No. 908,205, issued Dec. 29, 1908 for "Compartment Can";
Turan U.S. Pat. No. 1,655,238, issued Apr. 10, 1928 for "Container";
Fitzgibbons U.S. Pat. No. 2,713,779, issued July 26, 1965 for "Thermal Jug";
McDonald U.S. Pat. No. 2,763,134, issued Sept. 18, 1956 for "Refrigerated Container";
Proctor U.S. Pat. No. 3,178,903, issued Apr. 20, 1965 for "Food Preserver"; and
Wei U.S. Pat. No. 3,259,263, issued July 5, 1966 for "Twin Lock for Multi-Food Containers".

OBJECTS OF THE INVENTION

A first object of the instant invention is to provide an improved multi-container construction having many advantages over such containers known to the prior art.

Another object of the invention is to provide novel multi-container assembly constructions which make practical the individual transport, for individual or group use, of a multiplicity of containers of ice and/or liquid.

Another object of the invention is to provide a unique and improved multiple container construction wherein one of the containers, specifically, the lowermost, is uniquely adapted to receive and contain ice or ice water, the other container particularly adapted to carry, contain and dispense a second liquid such as fruit juice, tea or the like, which second liquid may be advantageously cooled by heat exchange.

Another object of the invention is to provide improved multi-container constructions which may be attached to one another for transportation and detached for use or filling as desired or needed, each container separately fillable and emptyable so that the liquids or contents of each container may be separately used, whether or not the contents of one of the containers is employed to heat exchange the contents of the other.

Another object of the invention is to provide a novel multi-container assemblage and construction wherein the contents of a first one of said containers may be used either to heat exchange the contents of the other container or entirely insulated and separated therefrom, whereby to provide an unusual versatility and capability of wide use to the improved combination.

Another object of the invention is to provide such improved multi-container constructions which are convenient to use, inexpensive to manufacture and purchase, of extremely simple construction, rugged and durable in nature and having a long life expectancy even though continuously used.

Another object of the invention is to provide a multi-container assembly construction which may usefully be substituted for and used in place of conventional thermos jugs and canteens or other liquid containers and have many additional features and advantages compared to such well-known and conventional constructions.

Still another object of the invention is to provide multi-container assembly constructions of the character described which may very advantageously be used for transport and dispensing of various liquids and the like at sporting events, picnics, in hiking, motorcycling and canoeing and like activities where the availability of such multi-part containers with advantages as described would be very greatly desired.

Other and further objects of the invention will appear in the course of the following description thereof.

In the drawings, which form a part of the instant specification and are to be read in conjunction therewith, embodiments of the invention are shown and, in the various views, like numerals are employed to indicate like parts.

DESCRIPTION OF THE DRAWINGS

FIG. 1 is an exploded view in three-quarter perspective from above of a first and preferred form of the invention illustrating a top container in the upper portion of the view, a bottom container in the lower portion of the view and an insulating lid for bottom container positioned therebetween.

FIG. 2 is a side, partially sectioned view of the container of FIG. 1 showing the three parts of that container assembly in position, together, engaged with one another.

FIG. 3 is a top plan view of the container assembly of FIGS. 1 and 2 with parts cut away to better illustrate the nesting construction.

FIG. 4 is a view of the lower portion of the container assembly of FIGS. 1-3, inclusive taken from the left-hand side of FIG. 2 looking to the right in the view, a portion of the lower container sectioned to show structural detail of the upper end thereof, the upper container in full lines shown spaced upwardly from the lower container and in dotted lines resting thereon.

FIG. 5 is a side view of a modified multi-container construction with portions of the upper and lower container cut away to better illustrate the mating engagement of the said containers.

FIG. 6 is a view like that of FIG. 5 but with the upper and lower vessels disengaged from one another and only the lower end portion of the upper container being seen, portions of both vessels cut away to show the engageable ends thereof.

FIG. 7 is a fragmentary sectional view of a second modified multi-container construction, particularly detailing the engagement of the lower end of the upper container and the upper end of the lower container.

FIG. 8 is a side elevation of a fourth multi-container construction, portions of the engaged ends of the vessels sectioned for showing of structural detail thereof, the filler cap and opening of the lower vessel also sectioned and detailed.

FIG. 9 is a top plan view of the multi-container construction of FIG. 8 with a portion thereof cut away to better illustrate the structure of the top container base.

FIGS. 1-4, INCLUSIVE

In these figures, there is shown a preferred form of the subject multiple container assembly or unit. This assembly or unit comprises, in combination, an upper vessel generally designated 10, a lower vessel generally designated 11 and an insulating cover 12 which may or may not be employed, as desired, with the two vessels. This preferred form, as seen in FIGS. 1-4, inclusive, differs from the modified multi-container assembly of FIGS. 5 and 6 primarily in the following structural features:

(1) The vessels of the multi-container assembly are of square or rectangular configuration in horizontal section;

(2) A finger grip handle is formed in one side wall of the upper container to the form of FIGS. 1-4, inclusive; and (3) The interengaging structure between the bottom of the upper vessel and the top of the lower vessel is reversed between the two forms.

Referring, then, to the upper container, this has front wall 13, rear wall 14 and side walls 15 and 16. The bottom wall 17 (generally designated) has a downwardly extending rectangular or square extension wall 18 which is closed off at its lower end by lowermost wall 19. The top wall 20 slopes upwardly and centrally to the rear from its peripheral connections with the front, rear and side walls and has cylindrical neck 21 extending upwardly therefrom. Neck 21 has externally threaded upper end 21a which is removably and threadably engaged by cap 22, the latter being retained with respect to container 10 by a chain 23 connected to the cap at 24 and neck 21 at 25. Rear wall 14 is inwardly recessed at 26 whereby to provide finger grip receiving shelf 27. Hinged engaging clamps 28 are shown provided on each of walls 15 and 16, pivotally connected to their bases 28a. A plurality of such engaging means may be provided on each wall 15 and 16 and one or more on each of walls 13 and 14, if desired for a stronger and more secure engagement.

Turning to vessel 11, again, the section of configuration is square or rectangular. There is provided front wall 30, rear wall 31, and side walls 32 and 33. A bottom wall 34 closes the lower end of the lower vessel, but the top is open, except when member 12 is employed, to be described. In the case of this lower vessel of the assemblage of FIGS. 1-4, inclusive, the side and bottom walls are insulated as seen particularly in FIGS. 2 and 4. In the specific example shown, this is accomplished by having a double thickness wall in each case with suitable foam or other insulation 35 positioned therebetween. The inner walls of the double wall sets are numbered the same as the outer walls corresponding thereto, but additionally labeled a, such as walls 30 and 30a (FIG. 2). The upper ends of the double walls of vessel 11 are closed over as at 36 and there may be provided, attached thereto, resilient gasket 37 of rubber or like resilient plastic material. Stops 38 are provided on walls 32 and 33 for engagement by hinged members 28. A pouring spout 39 is provided centrally of walls 30 and 30a, such having cap 40 removaly threaded thereon, same retained with respect to the spout 39 by chain 41 secured both to cap and spout. A circumferential flange 42 is provided on the inner walls of the lower vessel 11 above the outlet for the pouring spout 39 and spaced downwardly below the upper extremity 36 of vessel 11.

Suitable attachments 43 and 44 are provided on the back walls 31 and 14 of upper and lower vessels 10 and 11, adapted for removable engagement by a carrying member or strap 45.

The lid 12 may be made of any suitable material such as polyethylene, polypropylene, plastic foam faced by metal paper or the like, but is sized to fit down within the top of vessel 11 and rest upon flange 42. The height of the vessel 11 above the upper surface of flange 42, including the gasket 37, if present, is sufficient that, when lid or closure 12 is positioned on flange 42, the bottom wall 19 of extension 18 of container 10 just rests thereon. A sufficient extension of the central bottom portions of the upper container 10 into the lower container central opening is desired that there will be a secure engagement between the inner wall faces 30a, etc. and the outer face of wall 18.

A first use of the multi-container assemblage of FIGS. 1-4, inclusive may be described as follows. In this use, it is desired that a heat exchange take place between the contents of the lower vessel and that of the upper vessel. For example, the lower vessel is filled with ice by removal of lid 12 (filled from the top) and the lid 12 is not replaced. Then, the top container, filled, for example, with water or fruit juice, is then engaged with the lower container and the clamps 28 engaged with stops 38 to effect a complete closure.

The insulation in the lower container ensures that any heat exchange takes place largely through the single wall bottom 19 of the upper container, whereby the contents of the upper container are maintained cool. Whenever desired, the liquid from the top container may be dispensed. Also, from time to time, or thereafter, the cap 40 may be removed from the pouring spout 39 and cold or ice water dispensed from the lower container.

The upper portion of the upper container is configured so that the user's hand may conveniently handle and grasp the container by grasping the neck and upper portion of the container. Alternatively, the user may carry or handle the upper container or entire container assemblage by the finger grip at 27. Still further, the handle or strap 45 may be employed as desired.

In a second use of the container assemblage of FIGS. 1-4, inclusive, the lid 12 is placed on flange 42 before the containers are mated and secured together. In this case, typically, no heat exchange is desired. Thus, again, in the lower container, ice or ice and water may be supplied through the top of the container before the lid 12 is inserted. Any liquid not to be chilled may be put into the top container, for example, fruit juice. Thereafter, the two liquids may be dispensed as desired from the container.

Alternatively, in such a non-heat exchange use, hot coffee could be poured into the lower container before the insulating lid 12 is applied. Thereafter, ice or ice and water could be put in through the enlarged neck 21 of the top container. In this example, very conveniently, both hot and cold beverages could be carried in the same assemblage and used and dispensed with a minimum of heat or cold lost or exchanged therebetween.

DESCRIPTION OF FIGS. 5 & 6

As previously mentioned, the container assembly of FIGS. 5 and 6 differs from the assemblage of FIGS. 1-4, inclusive in three ways, particularly:

(1) The containers making up the assemblage are cylindrical in horizontal section;

(2) The male-female connection between the upper and lower containers is reversed or inverted; and (3) The handle element on the upper container 10 of FIGS. 1-4, inclusive (at 26, 27) is not present in this modification.

Turning, then, to FIGS. 5 and 6, at 50 is generally designated the lower container, at 51 (FIG. 6) a cylindrical insulating insert and at 52 the upper container.

Lower container 50 has an outer cylindrical wall 53 with an inner congruent wall 53a connected at the top thereto by web 54. Insulation 55 of plastic foam or other conventional material fills the space between normally vertical walls 53 and 53a. Bottom wall 56 also has a corresponding inner wall (not seen) in the manner of walls 34 and 34a in FIG. 2. A pouring spout 57 is positioned adjacent the upper end of walls 53 and 53a penetrating same in the manner of spout 39 of FIG. 2. Cap 58 is removably threaded on the externally threaded end of spout 57 and has chain 59 secured at one end to the spout and the other end to cap 58. An upstanding lip 60, circular in plan view, is positioned immediately above the upper end of wall 53a and has therebelow radially inwardly extending circumferential shelf or flange 61 which operates to receive thereon, optionally, the circular disc 51 of insulating material such as polyethylene, polypropylene, plastic foam or the like. Disc 51, like square 12, must be strong and rigid enough to be self-supporting when mounted on flange 61 or 42, respectively. Engageable integral blocks or protuberances 62 are positioned adjacent the upper ends of wall 53 on each side of container 50 or spaced regularly therearound, as desired or needed. A strap receiving loop 63 is positioned on the backside of vessel 50 to removably receive one end loop of strap 64 attached thereto.

Turning to the upper vessel 52, cylindrical side wall 65 is joined to bottom wall 66, forming the lower part of the container. The upper side wall 67 converges rearwardly to pouring spout 68 centrally of the backside thereof. Cap 69 is secured to the pouring spout 68 by chain 70 and removably threads on the upper externally threaded portion of spout 68. Mounting blocks 71 carrying pivotable engaging loops 72 are positioned on each side of vessel 52 adjacent the lower end thereof and may be provided in a greater number than that shown. Mounting loop 73 is positioned on the backside of vessel 52 to receive, removably, the upper loop connection of strap 64.

The lower end of vessel 52 has depending, circular circumferential flange thereon adapted to receive, inwardly thereof, flange 60 on the upper end of vessel 50. A gasket 54a may be provided atop wall 54.

The operation of the device of FIGS. 5 and 6 is the same as that described with respect to FIGS. 1-4, inclusive. Insertion of the insulating plate or insert 51 onto shelf 61 will serve to maintain heat integrity of or cold integrity of the vessels from one another. Thus, if hot soup is poured into the lower container, ice water, including ice, may be input to the upper vessel through the large pouring spout 68 which is preferably of size large enough to receive and pass therethrough conventional ice cubes. In the event that it is desired to have heat exchange between the vessels, the plate 51 is removed and, for example, the lower container filled with ice with the upper container filled with water, fruit juice or the like (or ice plus water).

As in the case of the modification of FIGS. 1-4, inclusive, it is the male-female connection between the bottom part of the upper vessel and the upper part of the bottom vessel as well as the connecting means exterior of the vessels which rigidly fix them with respect to one another in a stable unit for carrying and use, if desired.

As previously mentioned, both of the vessels may be wall insulated as is the case in vessel 50. Alternatively, both of the vessels or either one of them may be noninsulated as is the case in the vessel 52 of FIG. 5. This is also true of the vessels of FIGS. 1-4, inclusive.

FIG. 7

The showing in FIG. 7 is a modification of the device of FIGS. 5 and 6. In this view, parts which are essentially the same as those of FIGS. 5 and 6 will not be redescribed, merely numbered the same, but primed.

The essence of the difference in the showing of FIG. 7 is the provision of an additional member, a top closure for the bottom container 50'. This comprises, preferably, a flat circular sheet 75 having a multiplicity of holes or perforations 76 therewithin, as well as a peripheral, cylindrical, downwardly depending flange 77. The latter is adapted to overlie upwardly extending flange 60' (radially outside thereof) to fix (removably) closure 75 on flange 60'. Optionally, there may be provided normally horizontal flange 78 at the lower end of normally vertical flange 77 which will overlie sealing gasket 54a'.

When the closure 75 is in place on flange 60' (snapped thereover and around), it acts to retain ice within vessel 50' without losing, entirely, the heat exchanging capacity between the two vessels. When sheet 75 is provided without openings 76, it is to a certain extent a substitute for insert 51, providing some heat insulation, depending on its thickness. Such a closure generally makes vessel 50 more an independent container for separate use with the vessels 50 and 52 separated from one another. In such construction, the internal diameter of the downwardly depending flange or lip 74' is less than that of flange 74 in FIGS. 5 and 6. The closure 75 and the insulating plate 51 may be employed in combination if a flange (not seen) analogous to flange 61 in FIG. 5 is provided in FIG. 7.

A like closure may be employed in the form of FIGS. 1-4, inclusive. The structure would be the same as member 75-77-78 but inverted and sized to engage wall 37 and the inside upper surface of wall 30a. The outer diameter of wall 18 (or its dimension) would be lessened accordingly.

FIGS. 8 & 9

The container assembly of FIGS. 8 and 9 differs from the forms of the previous figures particularly in the following characteristics:

(1) Each of the containers (as is the case in FIGS. 5 and 6) are illustrated as circular in horizontal section, although this construction is optional;
(2) The connection or interengagement between the upper and lower vessels, when the parts of the container assembly are joined together, is different;
(3) There is no separate insulating member or removable cover for the lower vessel;
(4) The lower vessel has an integral top shown employed therewith;
(5) A different fill and dispensing opening is shown which permits the insertion and removal of conventional size ice cubes with dispensing of liquid from the lower vessel without loss of ice;
(6) A different handle construction is present with individual handles for each vessel which cooperate as a single handle when the parts of the vessel are engaged with one another; and
(7) The securement means for the top vessel cap is slightly different; and
(8) The lower vessel is not shown as insulated (optional).

Referring, then, specifically to FIGS. 8 and 9, this container assembly comprises a lower vessel generally designated 80 and an upper vessel generally designated 81. Lower vessel 80 has cylindrical side wall 82, bottom wall 83 and top wall 84. These walls, in combination, form an enclosed container into which openings are provided. A first set of such openings are provided centrally of upper wall 84 as at 85. Additionally, there is provided a relatively large diameter pouring spout 86 at the top of side wall 83 which carries, on the externally threaded outer end thereof, removable cap 87. Cap 87 has a pouring spout of lesser diameter 88 provided thereon, this spout normally closed by plug 89 which is fixed to the top or outboard surface of cap 87 by strap 90.

Lower vessel 80 is shown as having a single thickness, noninsulated wall, although, alternatively, the side and bottom walls 82 and 83 may be insulated in the manner seen in the previous figures. Top wall 84 is additionally provided with a circular recess or groove 91 formed therewithin immediately inboard of the outer wall thereof. Blocks 92 is provided, at least one on a side or regularly spaced around the periphery of the top and the side wall 82 for engagement purposes to be described. Handle 93 is provided 180° opposed to spout 86 (preferably) with the upper end thereof 93a preferably closely adjacent the top wall 84.

Upper vessel 81 has a cylindrical lower side wall 94 connecting to or integral with bottom wall 95 at its lower end. The upper side wall 96 tapers inwardly and rearwardly in off-set frusto-conical configuration to the base of the normally vertical upper pouring spout or opening 97. The upper end (not seen) of spout 97, which is of cylindrical configuration, is externally threaded to removably receive closure cap 98. The latter is removably secured to the upper end of spout 97 by strap 99. A handle 100 is provided on the rear wall preferably having its lower leg or arm 101 closely adjacent the bottom wall 95. Handles 100 and 93 are of like dimension so that they may be easily simultaneously grapsed by one or more fingers of the user's hand to carry the container assembly.

Bottom wall 95 has a groove or recess of circular shape provided at 102 operative to match and fit into groove 91 of the lower vessel 80 when the two vessels are joined together in the container assembly. One or more mounting blocks 103 are provided integral or attached to the lower side wall 94 of vessel 81, same pivotally mounting engaging loops 104 adapted to removably snap over and engage block 92 on the lower vessel.

In operation and use of the device of FIGS. 8 and 9, the following features and options are noted. First, with respect to the presence of the top wall 84 in the lower vessel 80, the following options are possible. One, the presence of relatively small openings 85 inboard of groove 91 operate to retain ice cubes or the like within the vessel when the two vessels are separate from one another yet permit a certain amount of heat exchange between the two vessels, more than if the wall 84 was solid. Another option is to cut out, centrally, the entire wall 84 inboard of mating groove 91 to provide such additional heat exchange. In such case, the filler opening construction as seen in FIGS. 8 and 9 is not required and a fill opening like spout 57 of FIGS. 5 and 6 could be employed. Yet further, the wall 84 may be, optionally, solid, without any openings, which would provide more heat insulation between the two vessels. In any of these options, the side and lower walls 82 and 83 of vessel 80 may be insulated. In the last option, the upper wall itself may be insulated, if desired. Considering these options, the function and uses of the two vessels, joined together or separated, are essentially the same as previously described with respect to the other figures and modifications.

The pouring spout construction of FIGS. 8 and 9 may be employed with any of the modifications of the previous figures, this giving great versatility to the filling and dispensing process in the lower vessel, particularly when same is joined with the upper vessel and the entire assembly handled as a unit. Likewise, the handle assembly of FIGS. 8 and 9 may be employed with any of the previous vessel constructions, if desired. In all cases, the internal diameter and size of the upper pouring spout (21, 68 or 97) is preferably sufficient that conventional size ice cubes may be inserted therewithin. The vessels themselves may be made of any suitable plastic such as polyethylene, polypropylene or the like or, alternatively, may be made of metal such as aluminum, aluminum alloys, stainless steel or the like.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A multi-vessel container unit comprising, in combination, a pair of separate vessels, one of which is removably mountable on top of the other with the lower end of the upper vessel removably engaging the upper end of the lower vessel, the upper vessel having a normally vertical pouring spout at the top thereof with a removable cap therefor, the upper vessel pouring spout of sufficient internal diameter that it will receive and pass therethrough conventional size, unmelted ice cubes, the lower vessel having a pouring spout in the side thereof adjacent the top end with a removable cap therefor, there being an opening into the lower vessel of sufficient size that same will receive and pass therethrough conventional size, unmelted ice cubes, plural means cooperating between the lower side wall of the upper vessel and the upper side wall of the lower vessel for removably securing the two vessels to one another as a portable, multi-vessel container unit, male-female engaging means cooperating between the lower end of the upper vessel and the upper end of the lower vessel for maintaining the two vessels fixed in axial alignment with one another when secured together by said latter means, the engaging ends of said vessels of like sectional configuration, the upper portion of the upper vessel tapering upwardly in off-set frusto-conical form to the side of the upper vessel with the pouring spout of the upper vessel extending upwardly from the apex of the said off-set frusto-conical structure, the upper end of the lower vessel being largely open, thereby to receive and pass therethrough conventional size, unmelted ice cubes, with the pouring spout in the lower vessel being of such relatively small size so as not to pass conventional size, unmelted ice cubes therethrough, a circumferential flange on the interior wall of the lower vessel adjacent the top thereof adapted to receive a slab of insulating material removably thereon, the side and bottom walls of the lower vessel being insulated, and handle means cooperating between the upper and lower vessels when joined together for handling the two vessels together as a container unit.

2. A container unit as in claim 1 wherein the lower vessel and the lower portion of the upper vessel are rectangular in horizontal section and there is provided a recessed handle in one wall of the rectangular horizontal section portion of the upper container.

3. A container unit as in claim 1 wherein the lower portion of the upper vessel and the upper portion of the lower vessel are circular in horizontal section.

* * * * *